United States Patent [19]
Nusser et al.

[11] Patent Number: 5,623,902
[45] Date of Patent: Apr. 29, 1997

[54] METHOD AND ARRANGEMENT FOR IDLE ADJUSTMENT OF AN INTERNAL COMBUSTION ENGINE

[75] Inventors: Claus-Dieter Nusser, Schwieberdingen; Peter Henkelmann, Sersheim; Markus Lischwe, Rieden, all of Germany

[73] Assignee: Robert Bosch GmbH, Stuttgart, Germany

[21] Appl. No.: 478,774

[22] Filed: Jun. 7, 1995

[30] Foreign Application Priority Data

Sep. 19, 1994 [DE] Germany ............... 44 33 299.8

[51] Int. Cl.[6] .............................. F02M 3/06; F01M 1/20
[52] U.S. Cl. ......................... 123/339.16; 123/339.24; 123/196 S
[58] Field of Search ................ 123/339.14, 339.15, 123/339.16, 339.17, 339.18, 339.19, 339.24, 196 AB, 196 S

[56] References Cited

U.S. PATENT DOCUMENTS

| | | | |
|---|---|---|---|
| 4,345,557 | 8/1982 | Ikeura | 123/339.18 |
| 4,760,824 | 8/1988 | Sakurai | 123/339.15 |
| 4,796,204 | 1/1989 | Inoue | 123/196 S |
| 5,002,026 | 3/1991 | Ohkumo et al. | 123/339.22 |
| 5,010,862 | 4/1991 | Hashimoto et al. | 123/339.16 |
| 5,163,399 | 11/1992 | Bolander et al. | 123/339.17 |

FOREIGN PATENT DOCUMENTS

27735   1/1992   Japan .............. 123/339.14

Primary Examiner—Willis R. Wolfe
Attorney, Agent, or Firm—Walter Ottesen

[57] ABSTRACT

A method and an arrangement for idle adjustment of an internal combustion engine provide that the idle rpm is increased when the engine is warm. A warm engine is then present when the oil temperature exceeds a threshold at which the oil pressure can become too low. Exceeding the oil temperature threshold is determined in dependence upon the engine temperature, the intake-air temperature and, if necessary, the engine rpm and the load of the engine.

17 Claims, 5 Drawing Sheets

Fig. 6

METHOD AND ARRANGEMENT FOR IDLE ADJUSTMENT OF AN INTERNAL COMBUSTION ENGINE

BACKGROUND OF THE INVENTION

If an internal combustion engine is operated for a longer time duration in the full-load range and then is braked into the idle range, the problem is presented that the engine overheats when the idle rpm, which is usually adjusted, is maintained unchanged. An oil pressure which is too low in order to ensure adequate lubrication of the engine occurs especially because of the high oil temperatures which are then present.

To prevent the above and similar unwanted situations, U.S. Pat. No. 4,345,557 discloses that the idle speed adjustment of an internal combustion engine is carried out in the context of an idle rpm control and the desired value of this control is inputted in dependence upon the coolant temperature of the engine in such a manner that the rpm is increased in the so-called hot idle state above a predetermined engine or coolant temperature. The cooling action is amplified in this way.

U.S. Pat. No. 5,002,026 discloses the application of the oil temperature for adjusting the idle in the normal operating range. The oil temperature is determined from other variables in order to avoid the expense of providing an oil-temperature sensor. For this purpose, the time span is determined during which the coolant temperature is equal to or greater than a temperature threshold. A measure or quantity for the oil temperature is determined from a pre-given relationship between this time span and the oil temperature and the idle rpm is correspondingly adjusted. However, measures are not disclosed which, in combination with the so-called hot idle, determine the threatening drop of the oil pressure.

SUMMARY OF THE INVENTION

In view of the above, it is an object of the invention to provide a method and an arrangement which make it possible to increase the idle rpm when the operating state of the so-called hot idle is reached wherein a low oil pressure threatens to occur.

With the method and arrangement of the invention, the operating state of hot idle can be satisfactorily controlled. Here, the method and arrangement of the invention make it possible to increase the idle rpm when the oil pressure threatens to become too low. It is especially advantageous that the invention permits detecting when an oil-temperature threshold is exceeded above which an oil pressure threatens to occur which is too low. This is done without utilizing an oil-temperature sensor.

The time that the engine is operated at high rpm or at high load is essential for the increase of the oil temperature. In this connection, the increase above the oil-temperature threshold is estimated in an advantageous manner on the basis of a time span formed from the rpm and the engine load and, if required, from the engine temperature and/or the temperature of the intake air.

It is especially advantageous in the determination of this time span to apply the time at which the engine is operated at an rpm above a limit rpm or above a limit load. It is advantageous to consider the time for which the engine is operated at an rpm below a limit rpm or below a limit load.

By considering the load state of the engine, it is advantageous that all operating conditions occurring in practice are reliably covered. These operating conditions include mountain driving, trailer operation and the like.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
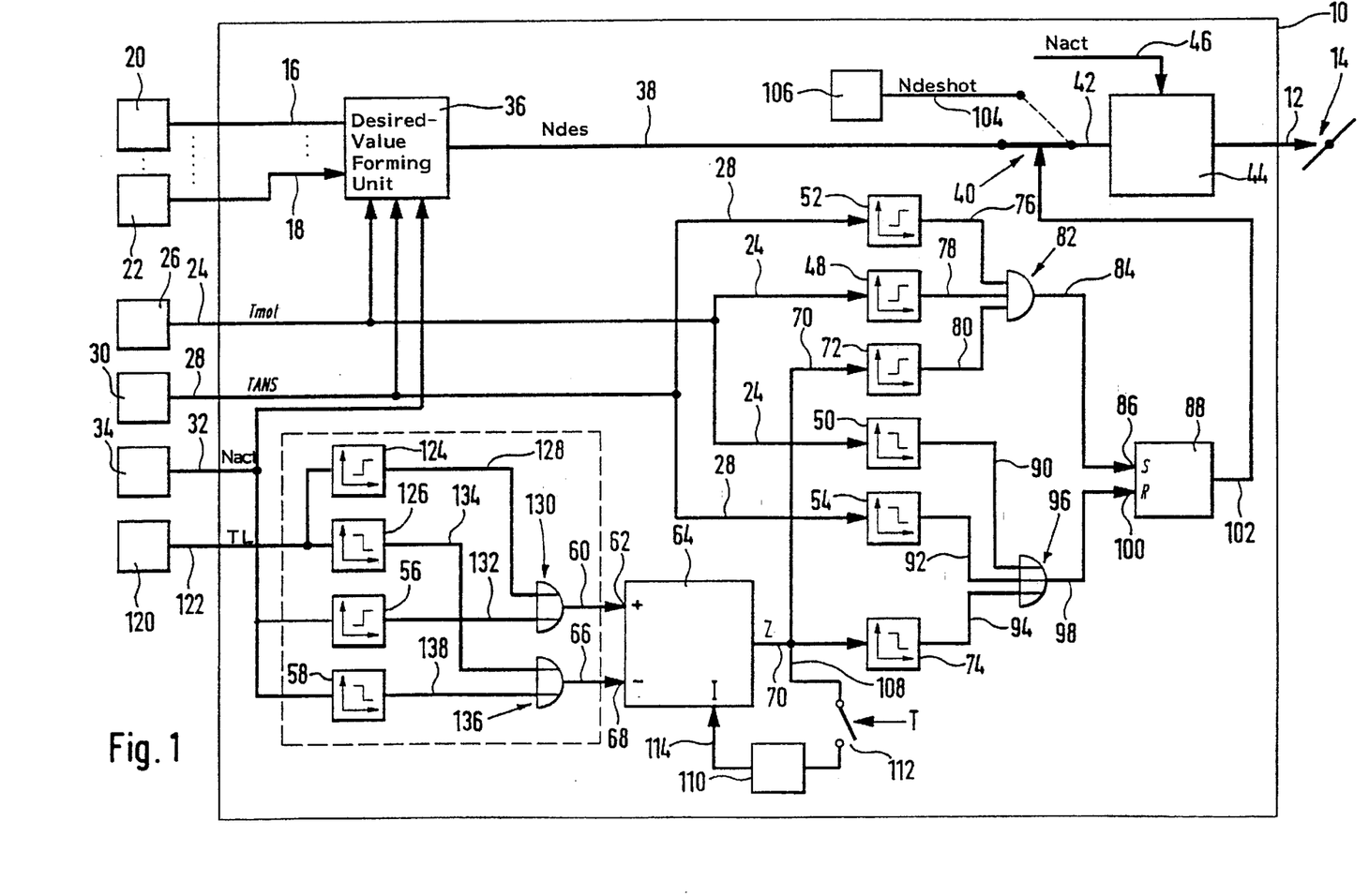
FIG. 1 is a block circuit diagram of an embodiment of the arrangement according to the invention.

FIG. 1 shows a control unit 10 which actuates functions (not shown) such as fuel metering and ignition adjustment as well as an actuating element 14 for adjusting at least the idle air to the engine. This actuation takes place via output line 12 as well as other output lines which are not shown for the sake of clarity. The control unit 10 is connected via input lines 16 to 18 to measuring devices 20 to 22, respectively, for detecting operating variables of the engine and/or of the motor vehicle. The control unit 10 is also connected via the input line 24 to a measuring device 26 for detecting engine temperature (cooling-water temperature) and is connected via a line 28 to a measuring device 30 for detecting the temperature of the intake air. The control unit 10 is also connected via a line 32 to a measuring device 34 for detecting engine rpm.

The input lines 16 to 18 lead to a desired-value forming unit 36 having an output line 38 connected to a switch 40.

In an advantageous embodiment, at least one of the lines 24, 28 and 32 is likewise connected to the desired-value forming unit 36. A line 42 leads from the switch 40 to a controller 44 to which the engine rpm is supplied via a line 46. The line 12 is the output line of the controller 44. The line 24 leads, on the one hand, to a threshold-value stage 48 while, on the other hand, to a further threshold-value stage 50. The line 28 also leads, on the one hand, to a threshold-value stage 52 while, on the other hand, to a threshold-value stage 54. The line 32 leads to a threshold-value stage 56 and to a threshold-value stage 58. The output line 132 of the threshold-value stage 56 leads to an OR-gate 130 which, in turn, has an output line 60 leading to the incrementing input 62 of a counter 64.

In the same manner as above, the output line 138 of the threshold-value stage 58 leads to an OR-gate 136 having an output line 66 leading to the decrementing input 68 of the counter 64. The output line 70 of the counter 64 leads, on the one hand, to a threshold-value stage 72 while, on the other hand, to a further threshold-value stage 74.

The output line 76 of the threshold-value stage 52, the output line 78 of the threshold-value stage 48 and the output line 80 of the threshold-value stage 72 all lead to a logic AND-gate 82 having an output line 84 connected to a set input 86 of an element 88 defining a flip-flop function.

The output line 90 of the threshold-value stage 50, the output line 92 of the threshold-value stage 54 and the output line 94 of the threshold-value stage 74 all lead to a logic OR-gate 96 having an output line 98 leading to the reset input 100 of element 88. The output line 102 of element 88 leads to the switch 40. In its second switching position (shown by the broken line), the switch 40 connects the line 42 to a line 104. Line 104 extends from a memory 106 for storing the desired idle rpm Ndeshot during the hot idle state.

Furthermore, a line 108 leads from line 70 to a memory unit 110 in which the output value of the counter 64 is stored at pregiven time points (symbolized by switch 112). When switching on the ignition, this permanently stored value is loaded via the line 114 into the counter 64.

In addition, a measuring device 120 is provided which detects a quantity for the engine load. The measuring device can be a measuring element for detecting the air mass or air quantity supplied to the internal combustion engine, the intake pressure present in the intake system or the position of the throttle flap. Furthermore, and in an advantageous manner, the detection of the load signal (base injection time) TL can be provided in lieu of the measuring device 120. The load signal is formed in the control unit 10 in dependence upon engine rpm and at least one of the above-mentioned variables. A line 122 connects the measuring device 120 to a first threshold-value stage 124 as well as to a second threshold-value stage 126. The output line 128 of the threshold-value stage 124 leads to the OR-gate 130 and the output line 134 of the threshold-value stage 126 leads to the OR-gate 136.

In the normal operation of the control arrangement shown in FIG. 1, the desired-value forming unit 36 forms an idle speed rpm desired value Ndes in dependence upon the operating variables supplied thereto such as transmission position, battery voltage, et cetera as well as operating values such as engine rpm, cooling-water temperature and intake-air temperature. The idle rpm desired value Ndes is adjusted by the controller unit utilizing a comparison to the actual rpm by actuating the positioning device 14. The controller can, for example, be a PID-controller. In the so-called hot idle, the switch 40 is switched into the position shown by the broken line under the conditions described below and the idle rpm is adjusted on the basis of the desired value provided for this operating state.

The switchover to the higher desired value during hot idle takes place when there is a danger that the oil pressure will drop to low values. The higher desired value is greater in amount compared to the rpm desired value in normal operation. The danger of a drop in the oil pressure is detected when an increase of the oil temperature above a threshold value is computed.

In the first embodiment shown in FIG. 1, the switchover signal is then formed when the engine is operated for a pregiven time at an rpm above a limit rpm and/or in a higher load state (load measured value above a limit value) and, in addition, the engine temperature and, if required, the intake-air temperature are above pregiven limit values. In a preferred embodiment, the times at which the engine is operated below the limit rpm and/or below the load limit are also considered and, as an additional criterion, the cooling of the oil is applied.

The counter 64 is initialized and preferably set to the value 0 when the control arrangement 10 is first taken into service after interruption of the current supply (so-called original start). The counter value of the counter is increased at regular time intervals (for example, 10 seconds), preferably by 1, when the actual rpm exceeds the limit value (for example, 4,800 rpm) pregiven in the threshold-value stage 56. The counter value of the counter 64 is decremented at regular time intervals (for example, 10 seconds) when the actual rpm drops below the limit value pregiven in the threshold-value stage 58. This limit value is preferably identical to the limit value pregiven in the threshold-value stage 56. At the same time, a load limit value is pregiven in the threshold-value stages 124 and 126 which, for example, can amount to 70% of the maximum load (100%). If the load exceeds this threshold value, then the counter 64 is likewise incremented at pregiven time intervals and, if the engine load drops below this limit value, then the counter 64 is decremented. The counter value Z formed in this way is emitted via the line 70 and is stored permanently in the memory element 110 at pregiven time points. For a normal start of the internal combustion engine, the counter value permanently stored in the memory element 110 is loaded into the counter 64. Accordingly, the stored counter value is always the starting point.

The counter value Z is a measure for a time duration depending upon the engine rpm and the engine load. The time duration is determined from the time for which the rpm and/or the load exceed predetermined threshold values reduced by the time for which the engine is operated below the limit values. The time duration defines a measure for the time for which the engine is driven at high load and/or rpm. In this context, it should be noted that the counter value is limited to a minimum value and a maximum value.

The values of cooling-water temperature Tmot, the intake-air temperature TANS as well as the counter value Z are supplied to the threshold-value stages 48, 52 and 72 and are compared therein to pregiven threshold values. When the particular threshold value is exceeded, a corresponding signal is emitted via the lines 76, 78 and 80. If all three operating variables exceed the particular pregiven threshold value, then the logic AND-gate 82 generates a corresponding signal via the line 84 which sets the element 88. Correspondingly, the element 88 changes its output signal level on the line 102 and leads to the switchover of the switch 40. The operating state of hot idle is therefore detected when the engine temperature and the air-intake temperature exceed predetermined threshold values as well as when the rpm and/or the load lie above threshold values for a specific time duration. Stated otherwise, the time duration (for which the rpm and/or the load lie above the limit values) is compared to a threshold which is dependent upon the history of the time-dependent rpm and the load history. For example, the limit values in one embodiment are 4,800 revolutions per minute for the rpm, 100° C. for the engine temperature, 60° C. for the intake-air temperature and 70% for the engine load. The limit counter value is, for example, reached after 15 minutes when there is a continuous high rpm or high load but is reached after 7.5 minutes when there is a high rpm and a high load.

It should be mentioned that the operating state of hot idle can only be set outside of the start phases. The element 88 is reset with each start of the engine in order to provide a defined start point.

If the operating variables of cooling-water temperature, intake-air temperature and counter value drop below the threshold values pregiven in the threshold-value stages 50, 54 and 74, the respective threshold-value stages then generate a signal level on the lines 90, 92 and 94. The logic OR-gate 96 then generates an output signal on the line 98. This output signal leads to the reset of the element 88 and to switching the switch 40 into the position represented by the solid line when at least one of the above-identified operating variables drops below the pregiven threshold value. Then, the operating state of hot idle is recognized as being ended.

Personnel experienced in this area can realize the embodiment shown in FIG. 1 also with other switching means and obtain the desired function. Furthermore, and in an advantageous manner, another embodiment provides that it is only necessary to increment or decrement once when the rpm and load drop below or exceed the limit values. This is in contrast to the above-described embodiment wherein incrementing or decrementing takes place twice.

Figure 2:
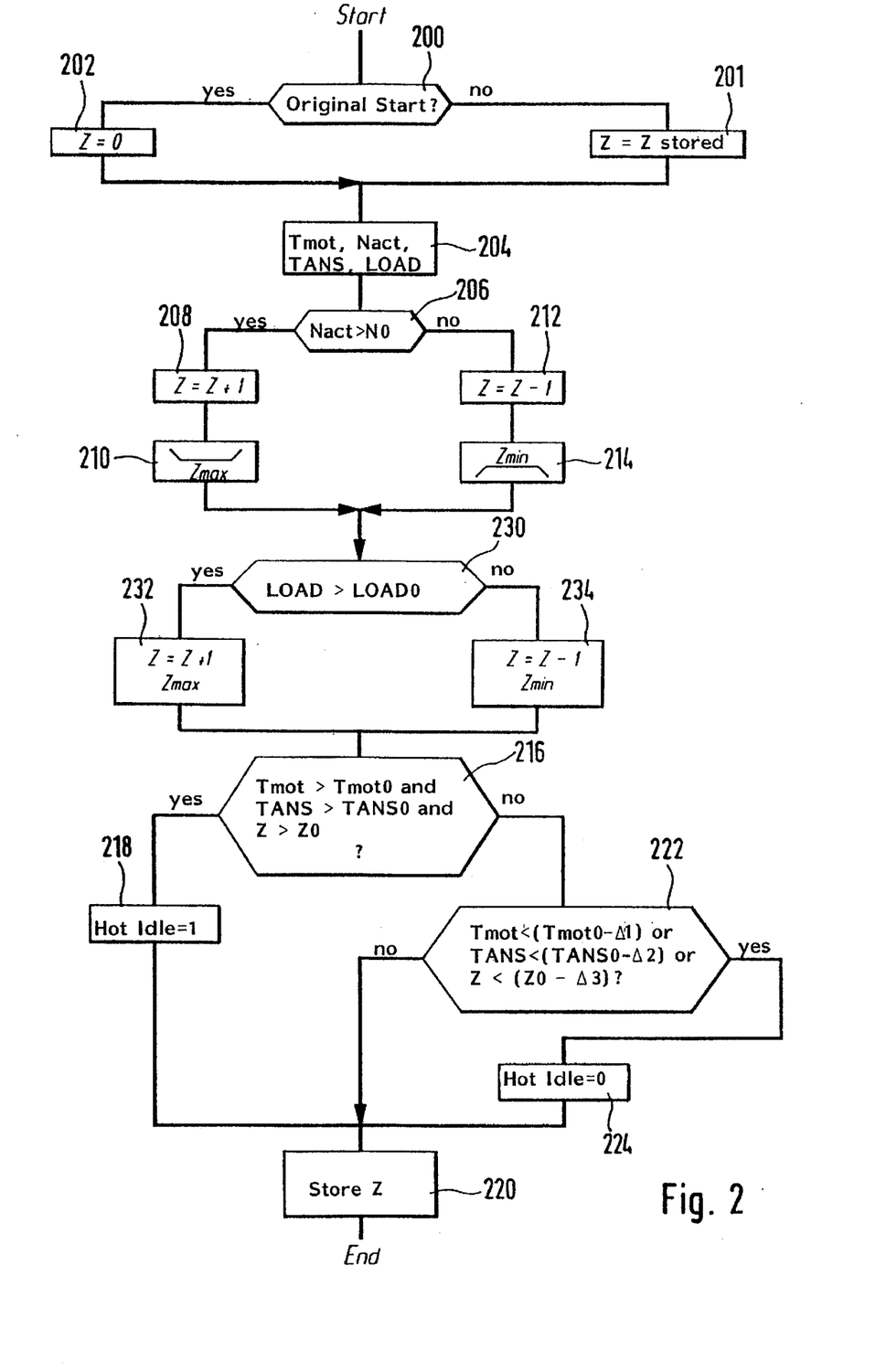
FIG. 2 is a flowchart associated with FIG. 1 and shows the sequence of steps of an embodiment of the method according to the invention in the context of a computer program.

FIG. 2 shows a flowchart as an embodiment of the method of the invention in the context of a computes program. The subprogram shown in the flowchart is called up at pregiven time points, for example, every 10 seconds. After the start of the subprogram according to FIG. 2, an inquiry is made in a first step 200 with respect to a mask as to whether an original start condition is present. If this is the case, then the counter value Z is set to 0 in accordance with step 202. If no original start condition is present, then the stored counter value Z is loaded in step 201. After step 201 or 202, the cooling-water temperature Tmot, the engine rpm Nact, the intake-air temperature TANS as well as a measurement value LOAD representing the load are read in in step 204. In the next inquiry step 206, an inquiry is made as to whether the actual engine rpm has exceeded a pregiven threshold value N0. If this is the case, the counter is incremented in step 208, that is, the counter is increased by 1 and, if necessary, in the next step 201, the counter is limited to its maximum value Zmax. If the engine rpm is equal to or less than the pregiven threshold value N0, then in step 212, the counter is decremented, that is, the counter value Z is reduced by 1 and, in the next step 214, the counter value Z is limited to the minimum value Zmin if required.

Thereafter, in inquiry step 230, a check is made as to whether the measured value of the load has exceeded a pregiven limit value LOAD0. If this is the case, then in step 232, the counter value Z is incremented and, if required, limited to its maximum value.

In the opposite case, the counter is decremented in step 234 and is limited to its minimum value as required. Thereafter, in inquiry step 216, a check is made as to whether: the cooling-water temperature has exceeded the threshold value Tmot0, the intake-air temperature has exceeded a threshold value TANS0 and whether the counter value is greater than a counter threshold value Z0. If all these conditions are present at the same time, then, in step 218, a mark for the operating state of hot idle is set. In the program of the idle rpm control, this leads to the situation that the idle rpm desired value Ndes is replaced by the desired value Ndeshot pregiven for this operating state.

After step 218, the counter value present is permanently stored in step 220 and the subprogram is ended. If a determination is made in step 216 that the three conditions are not simultaneously present, then a check is made in inquiry step 222 as to whether the cooling-water temperature Tmot is less than a threshold value (Tmot−Δ1) or the intake-air temperature is less than a threshold value (TANS−Δ2) or the counter value Z is less than a pregiven threshold value (Z−Δ3). If this is not the case, then nothing has changed in the actual operating state of the internal combustion engine so that the program can be continued with step 220 and the storage of the counter value Z. If one of the conditions checked in step 222 is satisfied, then, in step 224, the movement of the operating state out of hot idle or the normal operating state of the idle control is detected and the hot idle mark is correspondingly changed or held at the value which it had up until now. This leads in the program of the idle control to the situation that the idle rpm desired value Ndes forms the basis of the control. The idle rpm desired value Ndes is dependent upon the operating variables. After step 224, the counter value is stored and the subprogram is ended.

In accordance with this embodiment, the operating state of hot idle is detected as being arrived at or departed from in dependence upon the rpm, load, engine temperature and intake-air temperature. The operating state hot idle is present when the engine temperature and the intake-air temperature and a time duration (for which the rpm and/or the load are above pregiven limit values) each exceed pregiven threshold values. In each case, the time duration is also considered for which the rpm and/or the load are above these limit values. The operating state hot idle is not detected or deemed to be departed from when the engine temperature or the intake-air temperature or this time duration lie below pregiven threshold values.

Figures 3, 5:
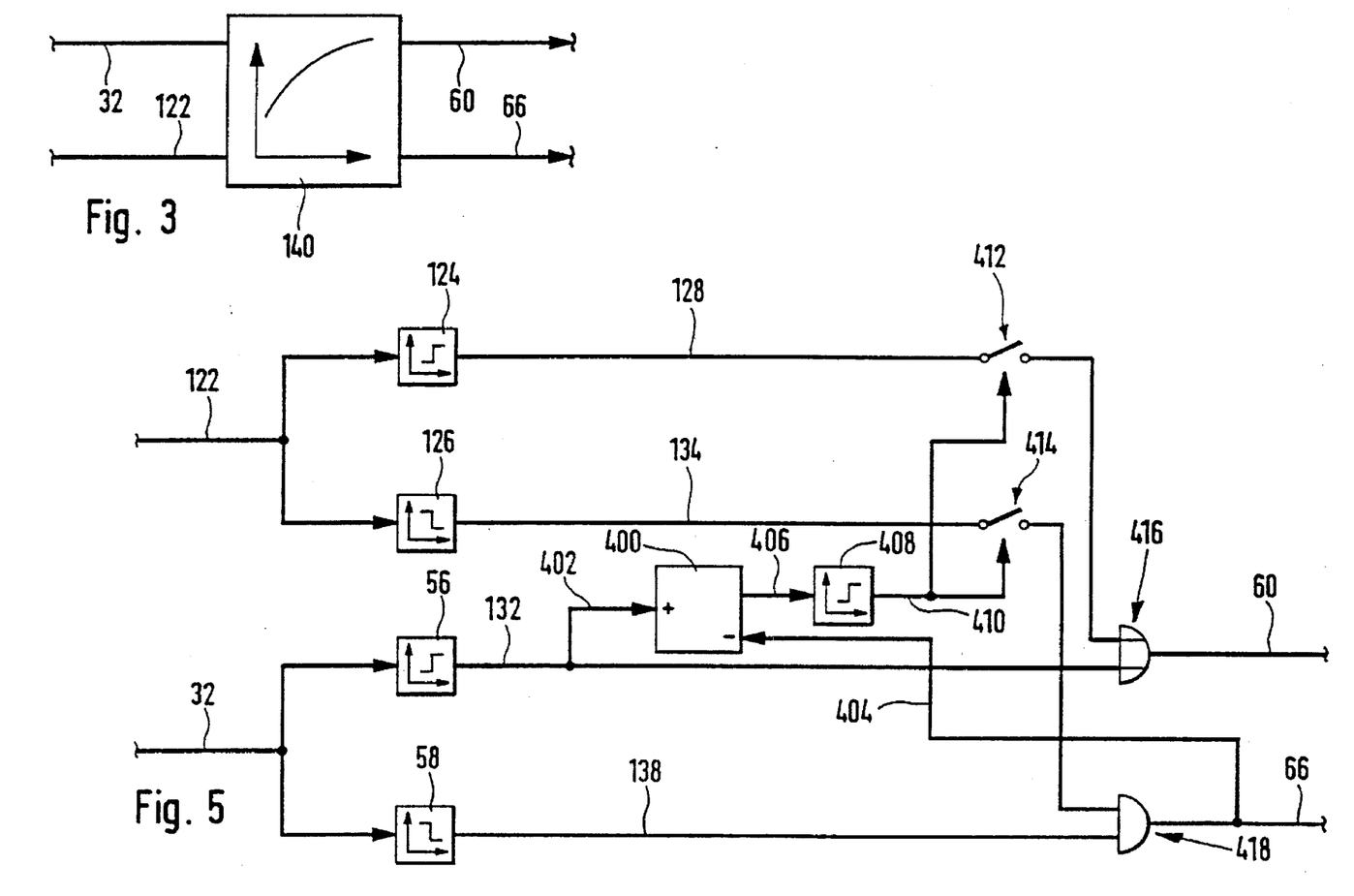
FIG. 3 shows an alternate embodiment of the arrangement according to the invention.
FIG. 5 shows a third embodiment of the arrangement according to the invention; and, FIG. 6 shows a third embodiment of the method of the invention also in the context of a flowchart.

In an alternate preferred embodiment, the portion in FIG. 1 enclosed by the broken line (stages 56, 58, 124 and 126 as well as OR-gates 130 and 136) is replaced by the solution shown in FIG. 3.

In accordance with FIG. 3, an element 140 is provided to which the rpm from measuring device 34 is supplied via line 32 and for which a measure for the engine load is supplied from measuring device 120 via line 122. The element 140 includes an rpm-load limit characteristic line or limit table such as a characteristic of load limit values as a function of rpm or rpm limit values as a function of load. The output line 60 leads from element 140 to the incrementing input 62 of the counter 64; whereas, the line 66 leads to the decrementing input 68. An incrementing of the counter 64 occurs when the characteristic line values or table values are exceeded by the supplied measurement values whereas a decrementing of the counter 64 occurs when the supplied measurement values drop below the characteristic line values or characteristic table values.

In element 140, a load limit value is assigned to the measured rpm based on the supplied measurement values and this load limit value is compared to the actual load which is read in. Incrementing of the counter results when the limit value is exceeded and decrementing of the counter results when there is a drop below the limit value. Alternatively, a limit rpm value can be read out of the characteristic line based on the load measurement signal. When this limit rpm value is exceeded, an incrementing of the counter results and, when there is a drop below this limit value, a decrementing of the counter 64 occurs. The counter value Z represents in this embodiment the time duration for which the internal combustion engine is operated at an operating point with high rpm or under high load. The time duration for which the engine is operated at operating points having low rpm or low load is considered by subtraction.

Figure 4:
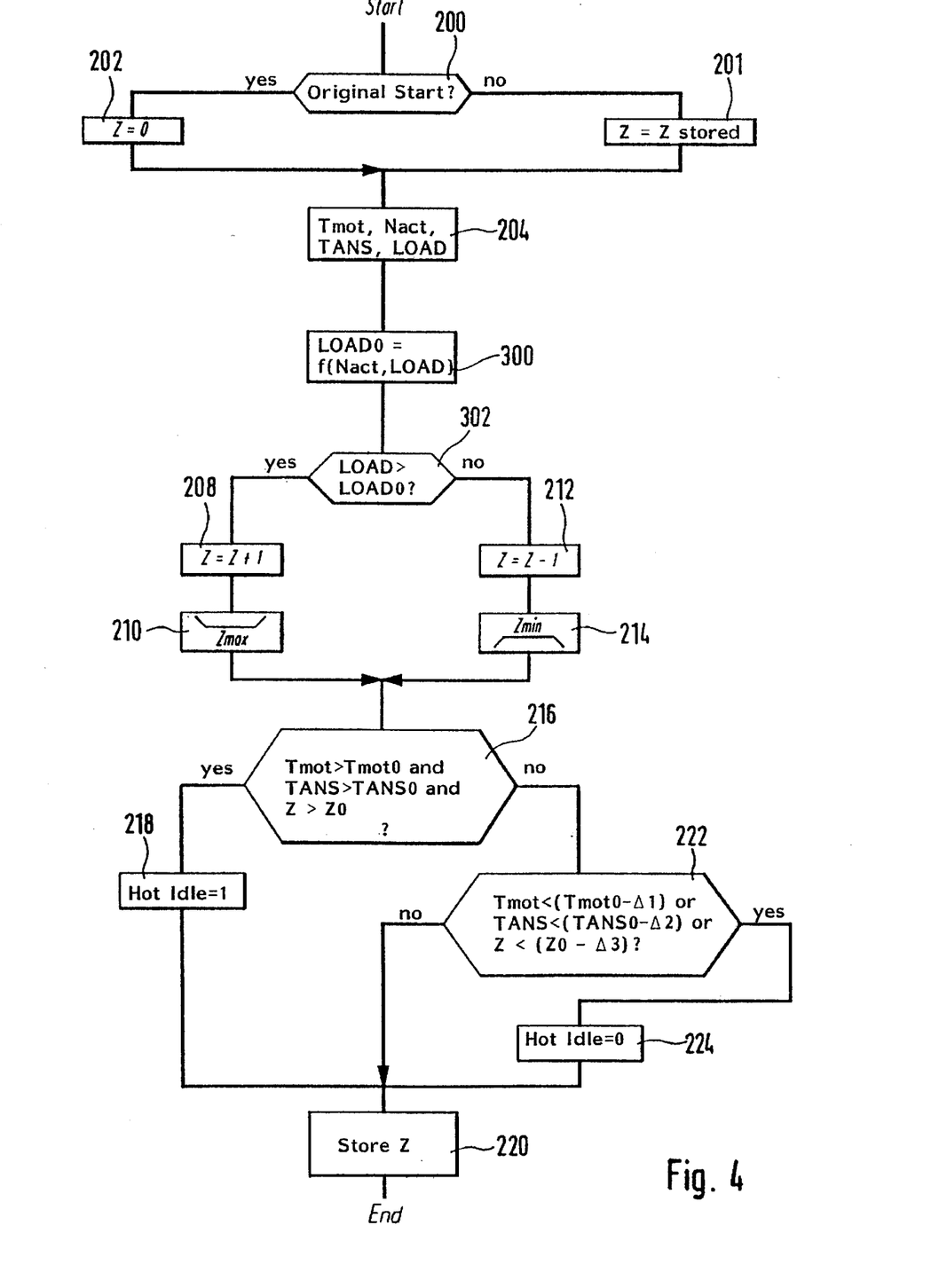
FIG. 4 shows a second embodiment of the method of the invention in the context of a flowchart.

The flowchart shown in FIG. 4 corresponds to the alternate embodiment shown in FIG. 3. The steps already shown in FIG. 2 are provided with the same reference characters and are not described below.

In the embodiment of FIG. 3, the step 206 as well as steps 230 to 234 can be replaced so that individual limit values are not checked; rather, a limit characteristic line is provided and an incrementing and decrementing of the counter 64 occurs when this limit characteristic line is exceeded or there is a drop therebelow. For this purpose, and after step 204, a load limit value LOAD0 is read out in a step 300 from the pregiven characteristic line on the basis of the measured variables rpm (engine speed) Nact and load LOAD. In the next inquiry step 302, this load limit value read out of the characteristic line is compared to the load measured variable LOAD. The counter is incremented in accordance with step 208 if the load measurement variable exceeds this limit value and the counter is decremented in accordance with step 212 if the load measurement variable drops below the load limit value. In lieu of the comparison on the basis of load values in step 302, another advantageous embodiment provides for the comparison on the basis of the rpm values. Then, an rpm limit value N0 is read out in a step 300 on the basis of actual rpm and load measurement variable and this value forms the basis of the comparison in step 302. If the actual rpm exceeds this limit value, the counter is incremented and, if there is a drop below this limit value, the counter is decremented.

In this embodiment too, the hot idle is detected when the engine temperature, the intake-air temperature and a time duration (which is dependent on engine rpm and load) exceed predetermined limit values.

Figure 6:
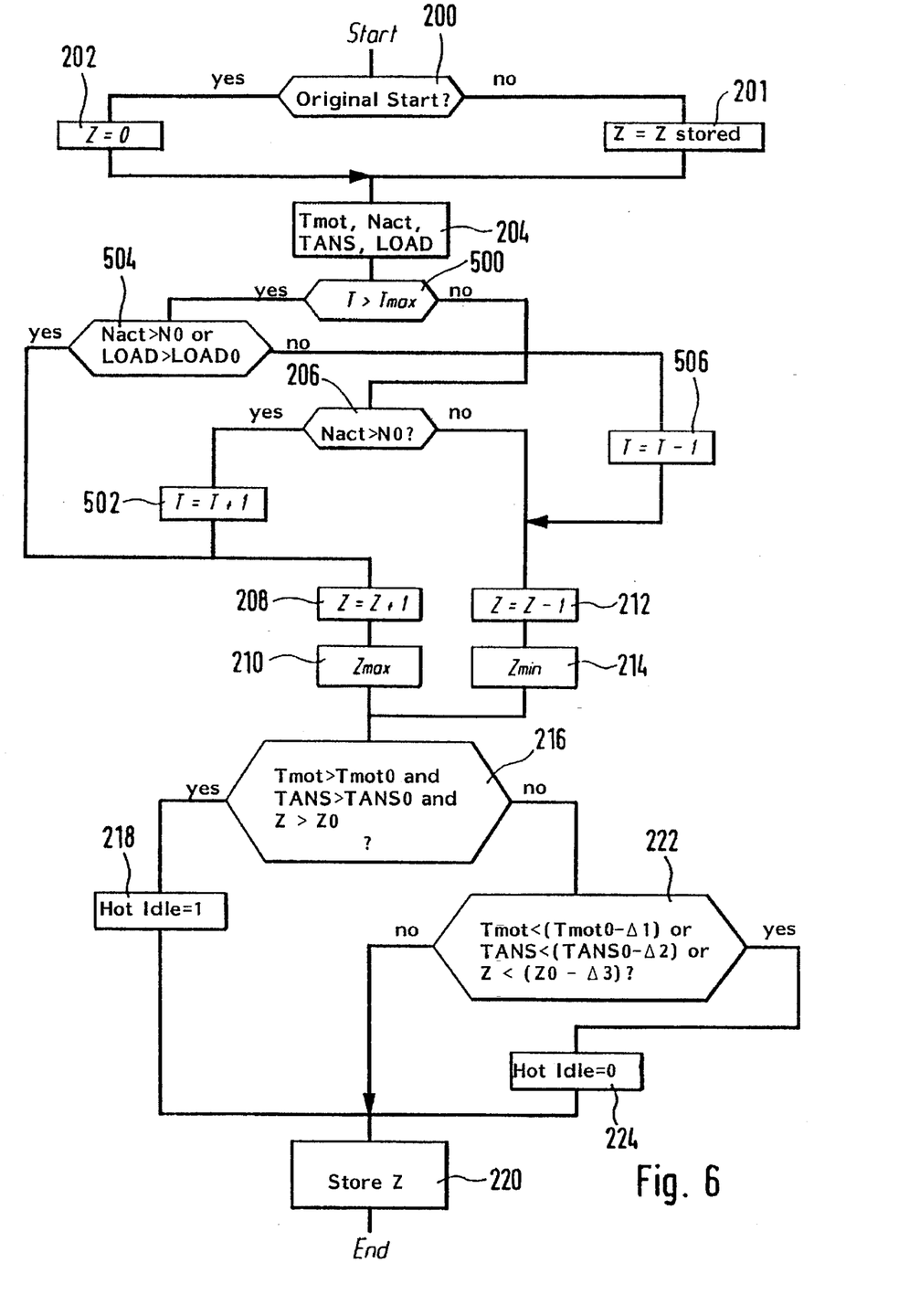

FIGS. 5 and 6 show a further advantageous embodiment of the invention. In FIG. 5, an overview block circuit diagram shows an alternative configuration of the portion enclosed by the broken line in FIG. 1. A further counter 400 is provided to which a line 402 is connected which extends from line 132 as well as a line 404 which extends from line 66. The output line 406 of the counter 400 leads to a threshold-value stage 408 having an output line 410 via which a first switch 412 and a second switch 414 are actuated. The first switch 412 is connected into line 128 which is the output line of the threshold-value stage 124 and which leads to an OR-gate 416. The line 132 leads to the OR-gate 416 and the output line of the OR-gate is identified by reference numeral 60. The second switch 414 is connected into the line 134 which is the output line of the threshold-value stage 126 and which leads to an AND-gate 418. The line 138 is the second input line of the AND-gate 418 which has a line 66 as its output line.

The additional elements consider the influence of the engine load on oil temperature or on the oil pressure independently of the engine rpm when the engine rpm has been above the limit rpm for a pregiven time. An incrementing of the counter 64 takes place when the load threshold is exceeded (OR-gate 416). A decrementing of the counter is only carried out when both thresholds are exceeded (AND-gate 418). If the engine rpm exceeds the threshold value pregiven in element 56, then, on the one hand, the counter 64 is incremented and, on the other hand, the counter 400 is incremented. If the counter value of the counter 400 reaches the limit value pregiven in the threshold-value stage 408, then the switches 412 and 414 are closed by generating a corresponding signal on the line 410 and the influence of load is considered. In this way, an incrementing of the counter 64 is caused when the load threshold is exceeded by the load measurement value in the threshold-value stage 124. This incrementation is independent of the rpm performance. If the load measurement value drops below the limit value pregiven in the threshold-value stage 126, then the load measurement value is supplied to the AND-gate 418. If, at the same time, the engine rpm drops below the limit value pregiven in element 58, then a corresponding signal is supplied on the line 66 which leads to decrementing the counter 400 and to decrementing the counter 64. The threshold value for the counter 400 is then less than that for the counter 64.

FIG. 6 shows a flowchart representing another embodiment of the method of the invention in the context of a computer program. After step 204, an inquiry is made in step 500 as to whether the second counter T has reached its maximum value Tmax. If this is not the case, then, in accordance with step 206, the actual engine rpm is compared to the pregiven threshold value N0 and, when the actual engine rpm is less than the threshold value, the counter 64 is decremented in accordance with step 212. If the actual rpm exceeds the threshold value N0, then the counter T is incremented in accordance with step 502 and the counter 64 is incremented in the next step 208. If the counter value T has reached its maximum value in accordance with step 500, then an inquiry is made in step 504 as to whether the engine rpm has exceeded the threshold value N0 or whether the load measurement value has exceeded the threshold value LOAD0. If this is the case, then, in accordance with step 208, the counter Z is incremented and, if the answer is negative (that is, both conditions are not satisfied), the counter T is decremented in step 506 and the counter Z is decremented in accordance with step 212. The further function sequence is as described with respect to FIG. 2.

Accordingly, in this embodiment, a solution is described for the case that the engine rpm has exceeded the limit rpm for a predetermined time and, in addition, the load influence is considered in that, independently of exceeding the rpm threshold, exceeding the load threshold leads to incrementing the counter Z. Decrementing the counter can only then take place when there is a drop below both the rpm threshold and the load threshold.

In each case, it is advantageous to adjust the idle rpm desired value Ndes only in the next idle cycle after leaving the hot idle operating state so that the driver notices no rpm changes in an idle cycle.

Furthermore, it is in each case advantageous to determine the incrementing speed and the decrementing speed of the counter 24 independently of each other. In a preferred embodiment, the decrementing speed can, for example, be greater than the incrementing speed.

Also, a hysteresis between incrementing and decrementing the counter is introduced in an advantageous embodiment. For this purpose, the limit values for the rpm and the load or limit characteristic line for exceeding and dropping therebelow are set to different values. In this way, a frequent back-and-forth switching between incrementing and decrementing is avoided. As a rule, the limit value for exceeding is selected to be greater in amount than the limit value for dropping therebelow.

Further, and in an advantageous embodiment, it is unnecessary to consider the engine temperature and/or the intake-air temperature.

It is understood that the foregoing description is that of the preferred embodiments of the invention and that various changes and modifications may be made thereto without departing from the spirit and scope of the invention as defined in the appended claims.

What is claimed is:

1. An arrangement for adjusting the idle rpm of an internal combustion engine provided with engine oil to lubricate the engine, the arrangement comprising:

a measuring device for detecting the load on said engine and for supplying a signal indicative of said load;

a control apparatus including a microcomputer for receiving said signal;

an actuator device for adjusting the idle rpm of said engine;

said microcomputer being adapted to generate a drive signal for driving said actuator device for adjusting the idle rpm of said engine; and, said microcomputer being further adapted to execute the following steps:

determining an operating state of said engine at least on the basis of said engine load (TL) wherein the oil temperature exceeds a threshold value above which an oil pressure can be expected which is too low to adequately lubricate said engine and said operating state being detected when said engine has been driven at high load for a given time duration; and, adjusting said drive signal to increase said idle rpm of said engine when said operating state has been determined to be present thereby facilitating lubrication of said engine.

2. A method for adjusting the idle rpm of an internal combustion engine provided with engine oil to lubricate the engine, the method comprising the steps of:

detecting at least an engine load (TL) on said engine;

determining an operating state of said engine at least on the basis of said engine load (TL) wherein the oil temperature exceeds a threshold value above which an oil pressure can be expected which is too low to adequately lubricate said engine and said operating state being detected when said engine has been driven at high load for a given time duration; and, increasing said idle rpm of said engine when said operating state has been determined to be present thereby facilitating lubrication of said engine.

3. The method of claim 2, wherein said operating state is assumed to be reached when a time duration exceeds a predetermined limit value; and, said time duration being that time duration during which the engine has been operated above a pregiven rpm-load operating condition.

4. The method of claim 3, wherein said operating state is assumed to be reached when also the engine temperature and intake-air temperature have exceeded specific limit values.

5. The method of claim 2 wherein the influence of load on the oil temperature is only then considered when the engine rpm has exceeded a limit rpm for a pregiven time duration.

6. The method of claim 5, wherein a count of a counter is incremented independently of the engine rpm exceeding an rpm limit value when the load exceeds the load limit value; and, said count of said counter is only then decremented when both of said limit values are exceeded.

7. The method of claim 2, wherein the operating state of the engine is determined when an oil temperature threshold is exceeded at which the oil pressure threatens to fall.

8. The method of claim 7, wherein an increase above said oil temperature threshold is determined in dependence upon engine rpm and engine load.

9. The method of claim 8, wherein said increase above said oil temperature threshold is determined also in dependence upon at least one of the engine temperature and the intake-air temperature.

10. The method of claim 9, wherein an increase above said oil temperature threshold is assumed when the engine temperature exceeds a predetermined limit value.

11. The method of claim 10, wherein, when determining said time duration, the time duration is subtracted during which the rpm is below the limit rpm or during which the load condition of the engine is below the load threshold.

12. The method of claim 10, wherein said increase above said oil temperature threshold is assumed also when the air-intake temperature and the time duration exceed predetermined limit values; and, said time duration being a time duration during which the engine has been operated in a load condition above a load limit.

13. The method of claim 10, wherein, when determining said time duration, the time duration is subtracted during which the rpm is below the limit rpm or during which the operating point is below the limit characteristic line.

14. The method of claim 10, wherein said increase above said oil temperature threshold is assumed also when the air-intake temperature and the time duration exceed predetermined limit values; and, said time duration being a time duration during which the engine has been operated at an engine rpm above a limit rpm.

15. The method of claim 14, wherein a count of a counter is incremented or decremented in dependence upon engine rpm to determine said time duration.

16. The method of claim 15, wherein the speed of incrementing or decrementing said counter for determining said time duration can be set independently of each other.

17. The method of claim 15, wherein a hysteresis is provided between incrementation and decrementation.

* * * * *

UNITED STATES PATENT AND TRADEMARK OFFICE
CERTIFICATE OF CORRECTION

PATENT NO.  : 5,623,902
DATED       : April 29, 1997
INVENTOR(S) : Claus-Dieter Nusser, et al.

It is certified that error appears in the above-indentified patent and that said Letters Patent is hereby corrected as shown below:

In column 5, line 14:  delete "computes" and substitute -- computer -- therefor.

In column 5, line 18:  delete "mask" and substitute -- mark -- therefor.

In column 5, line 59:  delete "(Tmot" and substitute -- (Tmot0 -- therefor.

In column 5, line 60:  delete "(TANS-" and substitute -- (TANS0- -- therefor.

In column 5, line 62:  delete "(Z-" and substitute -- (Z0- -- therefor.

In column 7, line 13:  delete "NO" and substitute -- N0 -- therefor.

Signed and Sealed this

Eleventh Day of August 1998

Attest:

BRUCE LEHMAN

*Attesting Officer*     *Commissioner of Patents and Trademarks*